US008886820B2

(12) United States Patent
Suciu et al.

(10) Patent No.: US 8,886,820 B2
(45) Date of Patent: Nov. 11, 2014

(54) METHOD FOR TRANSFERRING A FLOW BETWEEN HETEROGENEOUS ACCESS POINTS

(75) Inventors: Lucian Suciu, Cesson Sevigne (FR); Mounir Benzaid, Elancourt (FR); Karine Guillouard, Chantepie (FR)

(73) Assignee: France Telecom, Paris (FR)

( * ) Notice: Subject to any disclaimer, the term of this patent is extended or adjusted under 35 U.S.C. 154(b) by 877 days.

(21) Appl. No.: 12/988,397

(22) PCT Filed: Apr. 9, 2009

(86) PCT No.: PCT/FR2009/050635
§ 371 (c)(1),
(2), (4) Date: Dec. 1, 2010

(87) PCT Pub. No.: WO2009/136089
PCT Pub. Date: Nov. 12, 2009

(65) Prior Publication Data
US 2011/0106959 A1 May 5, 2011

(30) Foreign Application Priority Data
Apr. 18, 2008 (FR) ..................................... 08 52653

(51) Int. Cl.
*G06F 15/16* (2006.01)
*G06F 15/173* (2006.01)
*H04W 36/00* (2009.01)
*H04W 80/04* (2009.01)

(52) U.S. Cl.
CPC ........ *H04W 36/0011* (2013.01); *H04W 80/045* (2013.01)
USPC ........... 709/230; 709/217; 709/219; 709/225; 709/229; 709/250; 455/436; 455/439

(58) Field of Classification Search
None
See application file for complete search history.

(56) References Cited

U.S. PATENT DOCUMENTS 6,108,546 A * 8/2000 Kusaki et al. .................. 455/436
6,167,269 A * 12/2000 Kondo ........................... 455/437
7,171,215 B2 * 1/2007 Khouaja et al. ............... 455/436

(Continued)

OTHER PUBLICATIONS

English Translation of the International Preliminary Report on Patentability and Written Opinion dated Nov. 9, 2010 for corresponding International Application No. PCT/FR2009/050635, filed Apr. 9, 2009.

(Continued)

*Primary Examiner* — Ranodhi Serrao
*Assistant Examiner* — Farrukh Hussain
(74) *Attorney, Agent, or Firm* — David D. Brush; Westman, Champlin & Koehler, P.A.

(57) ABSTRACT

A method is provided for handing off flows. The flow, having a flow identifier, is established between a terminal and a correspondent. The terminal has as many terminal identifiers as access interfaces to access networks of mutually different data technologies. A first execution entity converts a handoff execution order emanating from a decision entity into execution messages by taking into account a hierarchy of execution entities of a current network. After a handoff decision has been taken for a given pair of flow and terminal identifiers, the decision entity sends an execution order to the first execution entity. The first execution entity: selects a mobility protocol from the mobility protocols supported by the execution entities of the hierarchy associated with the current network; selects in the hierarchy at least one execution entity responsible for executing the mobility protocol; and sends to the selected execution entities respective execution messages.

9 Claims, 6 Drawing Sheets

(56) References Cited

U.S. PATENT DOCUMENTS

| | | | | |
|---|---|---|---|---|
| 7,953,044 B2* | 5/2011 | Xia et al. | | 370/331 |
| 8,289,920 B2* | 10/2012 | Wang et al. | | 370/331 |
| 2005/0153743 A1* | 7/2005 | Berra et al. | | 455/560 |
| 2006/0121901 A1* | 6/2006 | Tanaka et al. | | 455/436 |

OTHER PUBLICATIONS

Huu-Nghia Nguyen et al., "Enhancements for Simultaneous Access in Network-Based Localized Mobility Management" IEEE International Symposium on Personal, Indoor and Mobile Radio Communications. PIMRC, IEEE; PI, XX, Sep. 1, 2007, pp. 1-5.

Lucian Suciu et al., "A Hierarchical and Distributed Handover Management Approach for Heterogeneous Networking Environments" Networking and Services, 2007. ICNS. Third International Conference on, IEEE, PI, Jun. 1, 2007, pp. 1-7.

Damic D Premec B Patil M Sahasrabudhe Nokia Siemens Networks S Krishnan Ericsson D: "Proxy Mobile IPv6 Indication and Discovery; draft-damic-netlmm-pmip6-ind-discover-03.txt" IETF Standard-Working-Draft, Internet Engineering Task Force, IETF, CH, No. 3, Feb. 25, 2008, pp. 1-17.

International Search Report and Written Opinion, dated Jan. 14, 2010 for corresponding International Application No. PCT/FR2009/050635 filed Apr. 9, 2009.

* cited by examiner

METHOD FOR TRANSFERRING A FLOW BETWEEN HETEROGENEOUS ACCESS POINTS

CROSS-REFERENCE TO RELATED APPLICATIONS

This application is a Section 371 National Stage Application of International Application No. PCT/FR2009/050635, filed Apr. 9, 2009 and published as WO 2009/136089 on Nov. 12, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of telecommunications. The disclosure relates more particularly to the handoff techniques between wireless access networks of different technologies that use so-called packet mode protocols associated with the IP protocol, when a terminal is roaming. This type of handoff is more particularly referred to as a vertical handoff, bearing in mind that it relates to a flow handoff. The handoff takes place between two different access networks, that is to say, between two access points of different technologies. According to a conventional representation of the telecommunication networks, a distinction is made between the core network and the access networks for accessing this core network which interlinks the access networks, these various networks using the IP protocol for transferring data.

The disclosure is situated at the interface between a handoff decision chain associated with a decision entity and an execution chain associated with an execution entity. These two chains are independent, and they can be implemented in different entities and an aspect of disclosure determines a method of interaction between these entities. The disclosure affects terminal mobility management, the terminals being indifferently designated by the terms mobile, mobile terminal or mobile node, and involves techniques that use hierarchical tunnels.

Mobility management in cellular networks is based mainly on intercell handoff management. This handoff enables a mobile terminal to switch from the coverage of one access point to another access point while remaining reachable. This handoff procedure entails asking a manager in the network to put in place the signaling needed to handoff the call from the old access point to the new one. According to the disclosure, handoff designates the management of the mobility of a terminal which switches from the wireless coverage of one access point to another access point of different technology. However, the disclosure applies equally in the case of an intra-technology handoff and more particularly between two wireless access points, for example of WiFi type, subtended by access points connected to different IP domains. The change of access point must be performed with service continuity assured.

The disclosure applies equally to mobile radio type networks such as the GSM, UMTS, and HSDPA networks and to WIFI or WIMAX type networks.

BACKGROUND OF THE DISCLOSURE

The trend in networks towards protocols based on IP allows for mobility management through IP mechanisms, such as Mobile IP (MIP). This protocol enables a mobile to change its access point in different IP domains without changing its IP address. An IP domain may be defined as a contiguous portion of the Internet whose IP addresses belong to one and the same subnetwork. Mobility management in an IP network is based on detection of the change of access network (also called detachment network) by the mobile, the acquisition of a new IP configuration by the mobile and the registration of the new location with a central point in the network illustrated by FIG. 1, called Home Agent HA. The latter then routes the packets that arrive at the subscription network, also called home network, from the mobile to the network visited by the mobile by using an IP in IP encapsulation. However, since the mobile IP protocol is not suited to frequent changes of access points, the choice to separate macro-mobility and micro-mobility has been proposed. Micro-mobility corresponds to rapid and frequent local movements of a mobile within one and the same IP access network whereas macro-mobility corresponds to the movements of a terminal with change of IP access network. This separation makes it possible to reduce the location update delay and consequently the loss of data packets. Several protocols have adopted this choice; notable among them are the HMIP and Cellular IP protocols.

More recently, telecommunications operators have been turning towards a new mobility protocol based on the same principle as MIP, called PMIP (Proxy MIP). PMIP enables the mobility of a terminal to be taken over by the network without requiring the involvement of the terminal in the signaling interchange. The terminal must be identified with its attachment (or access) router and the latter "makes it believe" that it is still in its subscription network: the attachment router updates the location with the home agent and announces to the terminal its new default route, which is typically the IP address of the default gateway or default router.

Mobility management in a multivendor wireless network context comprises two major steps:

taking of the handoff decision to switch from an access point of a network of technology A to another access point situated in a network of technology B. This decision takes into account various parameters such as the preferences of the operator and of the user, the requirements of the applications and the network capabilities. The handoff decision is taken in the control plane.

execution of the handoff decision to take charge of the update of the mobile node location (or registration of the new location) in the network, and the updating of the routing of the user data and of the signaling to and from the new access point. The execution of the handoff takes effect in the data plane.

Unlike the conventional telecommunication networks, the IP networks have the control plane and the data plane merged together; the signaling is in-band. This means that the data packets and the signaling to set up the route pass through the same nodes of a network. Furthermore, within IP networks, it is usually the same entity that takes the decision and executes the handoff (for example, execution of the MIP protocol by the mobile node) whereas, within telecommunication networks (operator networks), the entity that takes the handoff decision is different from the entity that executes the handoff. Also, in most cases, these entities are centralized in the network, their configuration is fixed in the network and depends on the execution protocol used.

The final decision and the final execution of the handoff can be performed according to several embodiments depending on where these functionalities are implemented, either on the network side or on the mobile side:

mode 1: handoff control by the mobile and handoff execution in the mobile. The latter can maintain profiles that take into account user/operator preferences, the characteristics of the access networks and of the applications.

mode 2: handoff control by the network (by one or more functional entities of the network, typically by means of a mobility manager or via a decision entity chain) and handoff execution in the mobile, mode 3: handoff control by the mobile and handoff execution in the network (by one or more functional entities of the network), mode 4: handoff control by the network (by one or more functional entities of the network) and handoff execution in the network (by one or more functional entities of the network).

The mode may be determined dynamically. Thus, some work that proceeds within the IETF recommends that the mobile node should signal to the attachment network whether it is taking charge of the execution of the handoff using the MIP protocol or whether it is asking the network to perform this execution using the PMIP protocol. According to other work, the network announces its capacity to execute the handoff using the PMIP protocol and the mobile node expresses its preference regarding the use of this service. Some 3GPP specifications relating to the new architecture of the 3GPP mobile networks (LTE/SAE) can be used to define a hierarchy of tunnels for the mobility management. A number of mobility scenarios are given depending on whether handoffs within or between 3GPP access networks or handoffs between 3GPP systems or not between 3GPP systems are being performed.

Depending on the mobility management protocols available in the network, a hierarchy of tunnels may be formed by a number of tunnels of different types. A tunnel is set up to ensure the correct routing of IP packets between two nodes by passing through routers that do not necessarily know the respective mobility protocol associated with the packets. "Tunneling" is the method of encapsulating and decapsulating an IP packet either in another IP packet (for example MIP or PMIP), or in a packet of another type (for example GTP). For example, and with reference to FIG. 1, a mobile is reachable via a specific PMIP tunnel as far as its anchor point (in this case, the Serving Gateway SGW) in the SAE (System Architecture Evolution (i.e., the network of a future generation (called 4G) according to the 3GPP guidelines)) network; it is then reachable via a specific GTP tunnel as far as its access point at the link level (in this case, eNodeB). An anchor point is the point of entry into the access network allowing the mobile to connect to other networks; the traffic between the mobile and a node of another network mandatorily passes through this anchor point.

In the case of multivendor networks, a number of handoff decision or execution modes may exist concomitantly. This in particular raises the problem of the choice of the mode and of the decision and execution entities, in mobility management. Recently, works propose retaining only two possible handoff execution modes: Proxy MIP by the network or MIP by the terminal, the mobile terminal taking the decision to activate one or other of the modes. The mobile terminal discovers that that PMIP is supported by the network and may express its desire to activate it; there is no negotiation or possible control by the network as to the choice of handoff execution protocol. For example, certain specifications retained by the 3GPP combine the use of several mobility protocols that do not offer the means of controlling the activation of one or another protocol by the control plane entities responsible for taking the handoff decision.

SUMMARY

An embodiment of the invention proposes a method for handing off flows between multivendor access points, that is to say, between access points of different technologies, whether these access points belong to the same IP network or to different IP networks, which make it possible to automatically control the mobility of a terminal between these two access points without constraint concerning the choice of mobility protocol. An embodiment of the invention notably allows for centralized mobility management which enables the network to control any mobility of a terminal between multivendor access points.

Thus, the subject of an embodiment of the invention is a method for handing off flows between a first access point to a first access network to an IP-type core network to which a terminal is attached, called current network, and a second access point to a second access network to the core network, called visited network, the network being made up of the various preceding networks and access points, the flow, with the identifier F_ID, being established between the terminal and a correspondent, the terminal having as many identifiers MN_ID as access interfaces to access networks of mutually different data technologies, implemented by a pair of entities consisting of a handoff decision entity HOD* and a first execution entity HOE*, the first execution entity HOE* converts a handoff execution order emanating from the decision entity into execution messages by taking into account a hierarchy of the execution entities of the network consisting of at least one other execution entity, comprising at least the following step executed by the decision entity HOD* after the handoff decision has been taken for a given pair of flow and terminal identifiers (F_ID, MN_ID):

sending of an execution order to the first execution entity HOE*, the execution order containing at least the fields consisting of the flow identifier, the terminal identifier, an identifier of the current access point, an identifier of the visited access point and a flow direction indicator at the terminal level, and the following steps executed by the first execution entity HOE*:

selection of a mobility protocol from the mobility protocols supported by the execution entities of the hierarchy associated with the network, selection in the hierarchy of at least one execution entity responsible for executing the mobility protocol, sending to the selected execution entities of respective execution messages containing at least the fields consisting of the flow identifier, the terminal identifier, a flow direction indicator, an identifier of a network interface to which the mobility protocol must be applied, an indicator of the selected protocol, an address of the terminal, a default router address and two flags, Acq and LocUpd, to indicate to the execution entity if it is responsible for the acquisition of an update address for the terminal and for the updating of the location of the terminal.

The method determines a configurable interface between a decision chain, consisting of the various handoff decision-taking entities for a pair of identifiers (terminal identifier, flow identifier), and an execution chain, consisting of the various handoff execution entities for a given terminal, implemented by entities which may be distributed in the IP core network, the access networks, the access points and the terminal.

The selected protocol indicator identifies the protocol, and is, for example, set to MIP or PMIP.

The combined use of the two flags makes it possible to control the execution of the handoff either by the terminal, or by the network, or by the terminal and the network. If the Acq flag is set to one, the execution entity must acquire an update address for the terminal. If not, the execution entity finds the update address of the terminal in the address field. If the LocUpd flag is set to one, the execution entity HOE must update the location of the terminal: that is to say that the execution entity HOE must inform another execution entity HOE (usually the higher level HOE such as the Home Agent in the MIP case or the Local Mobility Anchor Point in the PMIP case) of the new address to reach the terminal MN by using signaling messages of the protocol specified in the mobility protocol field. This may be done by means of a signaling message from the mobility protocol. Updating the location of the terminal typically involves setting up a specific tunnel between these two entities HOE in order to route the packets from and to the terminal MN. If the LocUpd flag is set to zero, this means that the location update has already been done by another HOE entity. The values taken for the flags may equally follow another logic, in particular, the comparison value may be chosen to be equal to zero and not to one.

The protocol enables a new IP configuration to be acquired for the terminal that relates to the new location in the visited network and for the location of the terminal in the visited network to be updated. If the Acq flag is initialized at zero, the address field contains the address already acquired for the terminal MN. Otherwise, the address field contains no address.

The default return address is the default router for routing the packets from and to the terminal MN.

The handoff method according to an embodiment of the invention resolves the problem raised. In practice, the handoff method according to an embodiment of the invention makes it possible to control a handoff, in particular between multivendor access networks since the method takes account of a mobility protocol identifier. The method therefore makes it possible to manage any mobility of a terminal whether it takes place within one and the same network between access points of different technologies or whether it takes place between access points of two networks of different technologies. It allows for control of any mobility management protocol.

According to a particular embodiment, a handoff method a is such that, if the flow direction indicator is set to incoming and if the PMIP protocol is selected, then the first execution entity HOE* sends a handoff execution message to an execution entity of the network, and is such that, if the flow direction indicator is set to outgoing and if the PMIP protocol is selected, then the first execution entity HOE* sends a handoff execution message to an execution entity of the network and a handoff execution message to an execution entity of the terminal to reorient the packets of the flow.

In the case of selection of the Proxy MIP (PMIP) protocol, the use of the flow direction makes it possible to send the terminal an execution message which enables the terminal to redirect the packets that it is sending to the correct network interface.

According to a particular embodiment, a handoff method is such that, the first execution entity HOE* learns the mobility protocols supported by the execution entities of the hierarchy associated with the network, following a handoff decision, dynamically by message interchange with these execution entities.

This embodiment has the advantage of limiting the update messages of the hierarchy of execution entities since the update is triggered following a handoff decision. It also has the advantage that the first execution entity selects a mobility protocol according to a knowledge of an up-to-date hierarchy; the selection can therefore relate only to a mobile protocol supported by the selected execution entities.

According to a particular embodiment, a handoff method is such that, the execution entity responsible for the acquisition of an update address of the terminal and for the updating of the location of the terminal is located in the network and is such that, the first execution entity HOE* sends an execution message, after the return of an execution acknowledgement by the execution entity responsible for the acquisition of an update address of the terminal and for the updating of the location of the terminal, to an execution entity of the terminal with the terminal address and default router address fields completed.

According to this embodiment, although the selected execution entities are located in the network, the method still sends an execution message to an execution entity of the terminal. This message has the advantage of enabling the terminal to know whether it is still attached to its current network which is typically its subscription network and to inform it of its default gateway. By informing the terminal of its default gateway, this makes it possible to save time for the execution of the handoff and therefore makes it possible to reduce the risk of possible loss of packets.

According to a particular embodiment, a handoff method is such that, the first execution entity HOE* is located in the terminal and knows the hierarchy of the execution entities through information supplied, following a handoff decision, by an entity of the access network that has connectivity below IP-User, and transmitted to the terminal by the access point to which the terminal is attached.

This embodiment offers the advantage of minimizing the information transmitted to the terminal to inform it of the hierarchy of the execution entities, by comparison to an embodiment whereby the entity of the access network, having connectivity below IP-User, periodically sends this information to the terminal.

Another subject of the disclosure is a device for implementing a method according to an embodiment of the invention.

Thus, a device according to an embodiment of the invention, intended to implement a method for handing off flows between a first access point to a first access network to an IP-type core network to which a terminal is attached, called current network, and a second access point to a second access network to the core network, called visited network, the network being made up of the various preceding networks and access points, the flow, with the identifier F_ID, being established between the terminal and a correspondent, the terminal having as many identifiers MN_ID as access interfaces to access networks of mutually different data technologies, comprises a handoff decision means HOD* and a first execution means HOE*, the first execution means HOE* converts a handoff execution order emanating from the decision means into execution messages by taking into account a hierarchy of execution means of the network consisting of at least one other execution means, is such that:

the decision means HOD* is able to send an execution order to the first execution means HOE*, following a handoff decision for a given pair of flow and terminal identifiers, the execution order containing at least the fields consisting of the flow identifier, the terminal identifier, an identifier of the current access point, an identifier of the visited access point and a flow direction indicator at the terminal level, the first execution means HOE* is able:
  a. to select a mobility protocol from the mobility protocols supported by the execution means of the hierarchy associated with the network,
  b. to select from the hierarchy at least one execution means HOE responsible for executing the mobility protocol, and
  c. to send to the selected execution means HOE respective execution messages containing at least the fields consisting of the flow identifier, the terminal identifier, a flow direction indicator, an identifier of a network interface to which the mobility protocol must be applied, an indicator of the selected protocol, an address of the terminal, a default router address and two flags, Acq and LocUpd to indicate to the execution means if it is responsible for the acquisition of an update address for the terminal and for the updating of the location of the terminal.

According to this subject, the decision means HOD* and the first execution means HOE* are co-located in one and the same device. This device is typically a router. It may quite possibly be any other network element or the mobile itself.

Another subject of the disclosure is a telecommunication system adapted to implement a method according to an embodiment of the invention.

Thus, a telecommunication system according to an embodiment of the invention comprises a network comprising at least one IP-type core network, a first and a second access networks to the core network, a first access point to the first access network to which a terminal is attached, called current network, and a second access point to the second access network, called visited network, able to handoff a flow between the first access point and the second access point, the flow, with the identifier F_ID, being established between the terminal and a correspondent, the terminal having as many identifiers MN_ID as access interfaces to access networks of mutually different data technologies, the network also comprising a handoff decision means HOD* and a first execution means HOE*, the first execution means HOE* being able to convert a handoff execution order emanating from the decision means into execution messages by taking into account a hierarchy of execution means of the network consisting of at least one other execution means (HOE), such that, after a handoff decision has been taken for a given pair of flow and terminal identifiers, the decision means HOD* is able:
  to send an execution order to the first execution means HOE*, the execution order containing at least the fields consisting of the flow identifier, the terminal identifier, an identifier of the current access point, an identifier of the visited access point and a flow direction indicator at the terminal level,
and such that the first execution means HOE* is able:
  to select a mobility protocol from the mobility protocols supported by the execution means of the hierarchy associated with the network,
  to select from the hierarchy at least one execution means responsible for executing the mobility protocol,
  to send to the selected execution means respective execution messages containing at least the fields consisting of the flow identifier, the terminal identifier, a flow direction indicator, an identifier of a network interface to which the mobility protocol must be applied, an indicator of the selected protocol, an address of the terminal, a default router address (Default Route) and two flags, Acq and LocUpd, to indicate to the execution means if it is responsible for the acquisition of an update address for the terminal and for the updating of the location of the terminal.

Another subject of the disclosure is an execution device able to control the execution of the handoff.

Thus, an execution device HOE* according to an embodiment of the invention, intended for a telecommunication system comprising a network comprising at least one IP-type core network, a first and a second access networks to the core network, a first access point to the first access network to which a terminal is attached, called current network, and a second access point to the second access network, called visited network, the system being able to handoff a flow between the first access point and the second access point, the flow, with the identifier F_ID, being established between the terminal and a correspondent, the terminal having as many identifiers MN_ID as access interfaces to access networks of mutually different data technologies, the network also comprising a handoff decision means HOD*, is able:
  to convert a handoff execution order emanating from the decision means HOD* into execution messages by taking into account a hierarchy of execution means of the current network consisting of at least one other execution means HOE,
  to select a mobility protocol from the mobility protocols supported by the execution means of the hierarchy associated with the network,
  to select from the hierarchy at least one execution means (HOE) responsible for executing the mobility protocol, and
  to send to the selected execution means respective execution messages containing at least the fields consisting of the flow identifier, the terminal identifier, a flow direction indicator, an identifier of a network interface to which the mobility protocol must be applied, an indicator of the selected protocol, an address of the terminal, a default router address and two flags, Acq and LocUpd, to indicate to the execution means if it is responsible for the acquisition of an update address for the terminal and for the updating of the location of the terminal.

According to a preferred implementation, the steps of the handoff method are determined by the instructions of a handoff program incorporated in an electronic circuit such as a chip, which in turn may be positioned in an electronic device such as a router located in the network. The handoff method according to an embodiment of the invention may equally be implemented when this program is loaded into a computation unit such as a processor or equivalent, whose operation is controlled by the execution of the program.

Consequently, an embodiment of the invention also applies to a computer program, notably a computer program on or in an information medium, suitable for implementing an embodiment of the invention. This program may use any programming language and be in the form of source code, object code or intermediate code between source code and object code such as in a partially compiled form, or in any other form that is desirable for implementing a method according to an embodiment of the invention.

The information medium may be any entity or device capable of storing the program. For example, the medium may comprise a storage means, such as a ROM, for example a CD ROM or a microelectronic circuit ROM, or even a magnetic recording means, for example a diskette (floppy disk) or a hard disk.

Alternatively, the information medium may be an integrated circuit in which the program is incorporated, the circuit being adapted to execute or to be used in the execution of the method concerned.

Also, the program may be translated into a transmissible form such as an electrical or optical signal, which may be routed via an electrical or optical cable, by radio or by other means. The program according to an embodiment of the invention may in particular be downloaded over an Internet-type network.

BRIEF DESCRIPTION OF THE DRAWINGS

Other features and advantages will become apparent from the following description given in light of the appended drawings and as nonlimiting examples.

DETAILED DESCRIPTION OF ILLUSTRATIVE EMBODIMENTS

Figure 1:
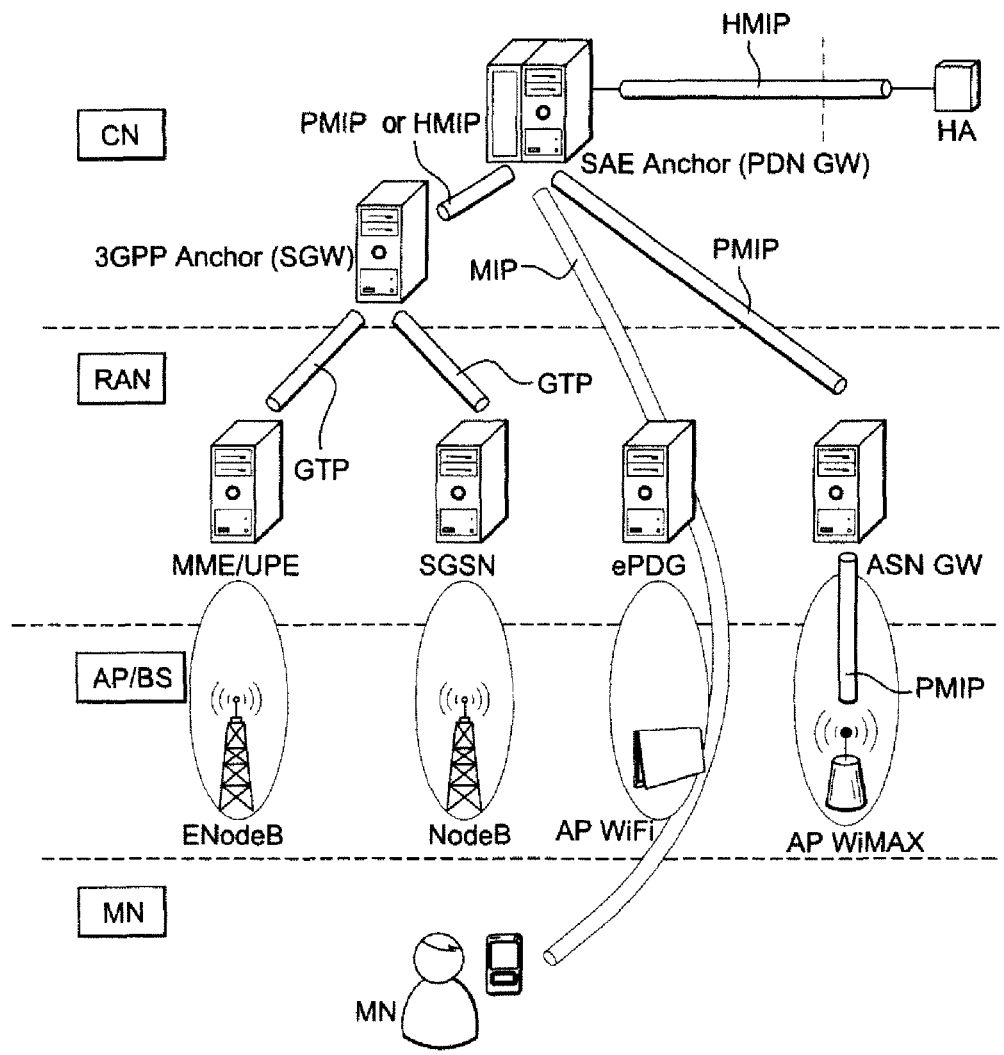
FIG. 1 is a diagram illustrating a multivendor architecture of a network consisting of a core network, several access networks and access points implementing several mobility protocols according to the prior art.
Figure 2:
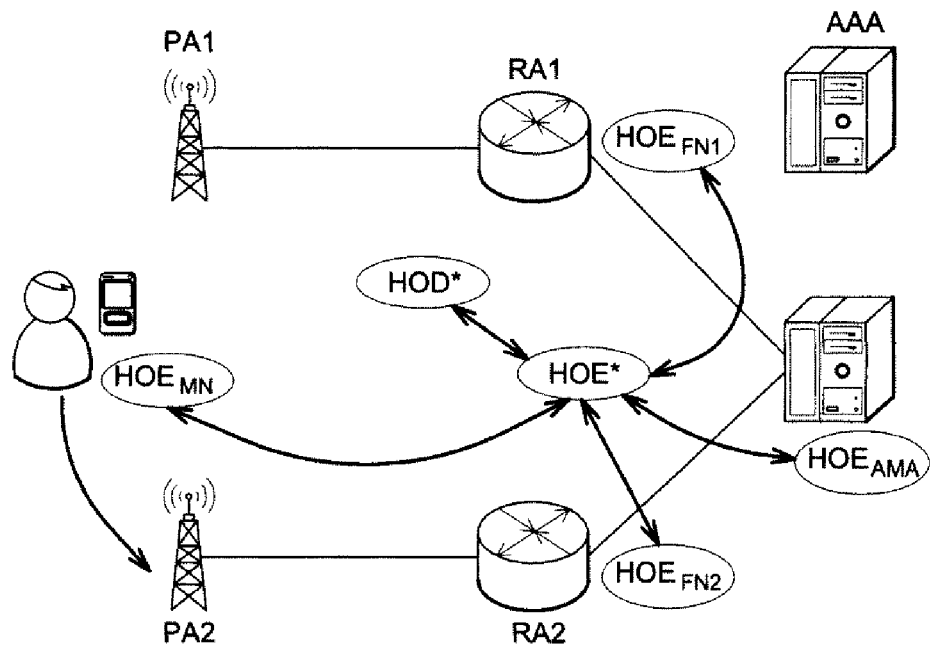
FIG. 2 is a diagram illustrating a multivendor architecture with several access networks for executing a method according to an embodiment of the invention.

FIG. 2 is a diagram illustrating a multivendor architecture with several access networks for an implementation of a method according to an embodiment of the invention.

The network comprises a core network, access networks, access points to these networks.

A first access network comprises an access router RA1 upon which the access point PA1 depends.

A second access network comprises an access router RA2 upon which the access point PA2 depends.

A mobile MN, called mobile node or mobile terminal, has at least two access interfaces of different wireless technologies. The mobile MN does not change source identifier (for example, subscription network IP address) when it changes from one access point of an IP access network to another. According to an embodiment of the invention, the entity MN is associated with a unique identifier MN's User ID. According to the illustration, the mobile keeps the same source identifier when changing from the access point PA1 to the access point PA2.

An entity AMA acts as anchor point for the IP connection of the mobile node MN in the network and keeps a trace on the location of the mobile node. This entity may be located in the source network or subscription network, also called current network, which can be accessed according to the example via the access point PA1, or in a network visited by the mobile, visited network that can be accessed according to the example via PA2. There may be several entities AMA in the network, each entity being associated with a level in the network. A level i AMA is labeled $AMA_i$. A node $AMA_i$ returns the packets addressed to the mobile node to the lower level entity AMA in the hierarchy (that is to say, $AMA_{i-1}$). The lowest node AMA in the hierarchy returns the packets of the flows associated with the mobile to a handoff entity FN which handles the link below IP-User with the mobile.

A handoff entity FN is an entity in an access network which maintains connectivity below IP-user between an anchor point AMA and a mobile node MN. Each handoff entity FN therefore depends on an entity AMA. It is possible to envisage a protocol other than IP being used to ensure network connectivity (i.e. the link below IP-User) between the terminal and its first point of connectivity to the transport network. Usually, this entity FN is located in the access router of the wireless technology concerned (for example, the ePDG in the case of a WiFi access network) or at the end of an IP-transport level tunnel (for example, the SGSN in the case of a UMTS access network). At the very least, there must be an entity FN for each access technology. In a cellular network such as UMTS, the IP protocol is present in two levels: an IP-transport level to ensure IP connectivity (via GTP protocol) between the GGSN and the SGSN; and an IP-user level of the higher layers between the GGSN and the mobile terminal. For IP mobility management, it is the IP-user level that is used.

According to the example, the handoff decision chain comprises, for a pair of mobile and flow identifiers (MN's User ID, application flow ID), at least one entity HOD* which takes the final handoff decision; this final decision is sent in the form of an order message to the execution chain and more specifically to the point of entry into this chain which is the entity HOE*.

This entity HOE* initiates and controls the execution of the handoff after having received the preceding order message. This entity HOE* is located, according to the example, in the network. It may equally be located in the terminal. The execution chain comprises a hierarchy of execution entities HOE comprising at least one entity HOE which converts this order message into messages of the selected execution protocol. This selection is typically made according to a selection of network parameters made by the operator of this network. The entity HOE* knows the execution capabilities of the entities HOE, in particular the mobility protocols implemented by the entities HOE. These execution entities are implemented in the form of anchor point AMA, handoff entity FN and/or mobile MN. According to the example, these entities are implemented in the form of an anchor point AMA, two handoff entities FN and the mobile MN.

Figure 3:
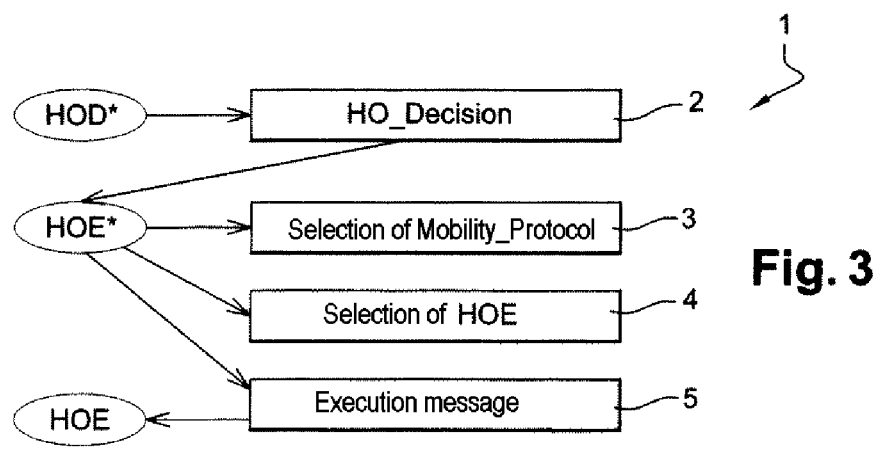
FIG. 3 is a flow diagram of one embodiment of a method according to an embodiment of the invention.

FIG. 3 is a flow diagram of one embodiment of a method according to an embodiment of the invention implemented by an architecture as illustrated by FIG. 2.

The method 1 hands off a flow between a first access point PA1 of a first network to which the terminal MN is attached (or anchored), called current network, and a second access point PA2 of a second network, called visited network. The current network is typically the subscription network. The flow, with the identifier F_ID, is set up between the terminal MN and a correspondent linked to the network, not represented in the figures. The terminal MN has as many identifiers MN_ID as access interfaces to access networks of mutually different data technologies. According to the example of FIG.

2, the terminal MN has at least two access interfaces respectively corresponding to access networks 1 and 2.

The method 1 is implemented by a pair of entities consisting of a handoff decision entity HOD* and a first execution entity HOE*.

When a decision entity HOD* takes a handoff decision concerning a pair of mobile and flow identifiers (MN's User ID, Flow ID), it consults a database of the execution capabilities of the network to ascertain the entity HOE* that is the point of entry into the execution chain and that handles the terminal's mobility. The entity HOE* may be located in the terminal or in the network. Typically, the entity HOD* is preconfigured with the address of the entity HOE*, and therefore this database is generally located with this entity HOD*. However, the database of execution capabilities may equally be in the HLR, in the HSS, and so on.

The first execution entity HOE* converts a handoff execution order emanating from the decision entity HOD* into execution messages, taking into account a hierarchy of the execution entities of the current network consisting of at least one other execution entity HOE.

The method 1 comprises at least the following steps 2, 3, 4, 5.

Step 2 is executed by the decision entity HOD* after the handoff decision has been taken for a given pair of flow and terminal identifiers, F_ID, MN_ID. This step consists in sending 2 an execution order, HO_Decision, to the first execution entity HOE*. The execution order contains at least the fields consisting of: flow identifier, F_ID, terminal identifier, MN_ID, an identifier of the current access point, an identifier of the visited access point and a flow direction indicator at the terminal level (the flow is either incoming, or outgoing at the terminal level), Flow direction.

The following steps 3, 4, 5 are executed by the first execution entity HOE*.

The step 3 consists in selecting 3 a mobility protocol from the mobility protocols supported by the execution entities HOE of the hierarchy associated with the current network. The first entity HOE* knows the hierarchy and the execution capabilities of the entities HOE. The entity HOE* must select the mobility protocol to be applied from the execution capabilities.

Step 4 consists in selecting 4, from the hierarchy, at least one execution entity HOE in the network and/or the terminal responsible for executing the selected mobility protocol.

Step 5 consists in sending 5 to the selected execution entities HOE respective execution messages containing at least fields consisting of: the terminal identifier, MN_ID, the flow identifier, F_ID, a flow direction indicator, Flow_direction, an identifier of a network interface, Interface ID, to which the mobility protocol must be applied and over which the flow must be sent, an indicator of the selected protocol, Mobility_Protocol, an address of the terminal to update the location, Acquired Address, a default router address, Default Route, and two flags to indicate to the execution entity whether it is responsible for acquiring an update address for the terminal, Acq, and for updating the location of the terminal, LocUpd.

For example, there are two possible options:
  if the first entity HOE* has chosen to activate an execution by the mobile MN, then it sends the handoff execution message to the entity HOE located in the mobile MN,
  if the first entity HOE* has chosen to activate an execution by the network, then it sends the handoff execution message to an execution HOE located in the network (for example, the access router serving the new access point).

A handoff execution message indicates to the node HOE that receives it the mobility protocol to be activated and whether it is responsible for acquiring a new address and/or for updating the location for the mobile MN. To control this handoff execution, three fields, Mobility Protocol, Acquired Address and Default Route, as well as two flags Acq and LocUpd, are used. The address acquisition and location update must be performed according to the mobility protocol to be applied.

Figure 4:
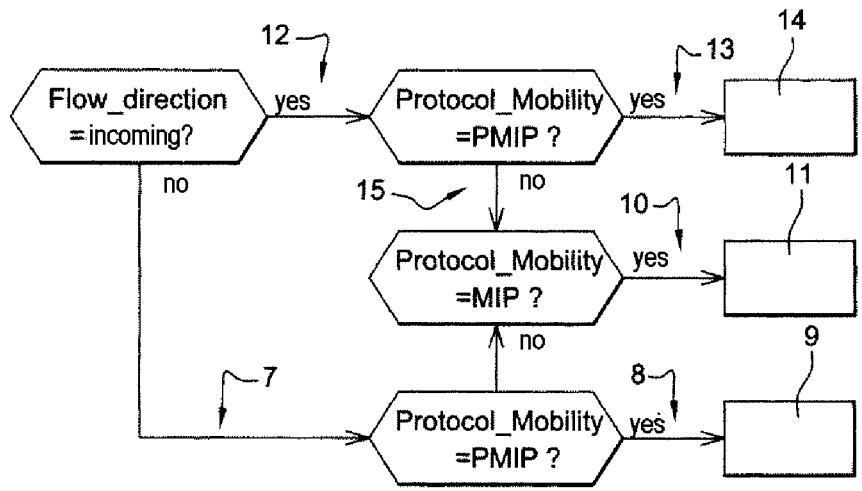
FIG. 4 is a flow diagram illustrating the influence of the flow direction indicator contained in the execution order message HO_Decision, in the case of the MIP and PMIP protocols.

FIG. 4 illustrates the influence of the flow direction indicator contained in the execution order message HO_Decision, in the case of the MIP and PMIP protocols. The Protocol_Mobility field is the same field as that designated by Mobility_Protocol.

In the case 7 of an outgoing flow and an execution 8 with the PMIP protocol, the first execution entity HOE* must send 9 both a handoff execution message to entities HOE in the network and a handoff execution message to the HOE of the mobile MN to enable the packets of this outgoing flow from MN to be directed to the correct network interface of the mobile. If the execution protocol is MIP 10 then the first execution entity HOE* must send 11 only a handoff execution message to the HOE of the mobile MN. In the case of the MIP protocol, the terminal alone must update its location with its anchor point. In the PMIP case, it is a network entity which updates the location, but the terminal must also be informed for it to be able to direct the outgoing flows; together, these messages make the complete execution of the IP handoff possible.

In the case 12 of an incoming flow and if the execution must be done with the PMIP protocol 13, then the first execution entity HOE* must send 14 only a handoff execution message to an HOE of the network. Once the decision has been taken to switch from a WiFi access point to a WiMAX access point, the network architecture deployed requires the first execution entity HOE* to send the execution message to an HOE determined according to how the parameters of the architecture are set, for example ASN GW. Otherwise 15, and if the execution must be done with the MIP protocol, then the first execution entity HOE* sends 11 a handoff execution order to the HOE of the mobile.

According to a preferred embodiment, an execution message HO_Execution is acknowledged by a confirmation message HO_Execution_Cfm which contains the result of the execution (OK/NOK) and the address, Acquired Address, to be used to update the location (if HO_Execution has the flag Acq set to 1): by using the two flags Acq and LocUpd, the execution of the handoff may be controlled either by the terminal, or by the network, or by the terminal and the network. The acknowledgement message HO_Execution_Cfm contains at least the fields consisting of: the flow identifier, F_ID, the terminal identifier, MN_ID, the flow direction indicator, Flow_direction, the address of the terminal, Acquired Address, and the result, Result.

According to a preferred embodiment, the control and execution of the handoff are preformed by means of the three messages described previously, and four generic messages:

HO_Decision: handoff order message as described previously.

HO_Execution: handoff execution message as described previously.

HO_Execution_Cfm: handoff execution confirmation message as described previously.

ACQ_REQ: this message is used to request an address for the mobile MN. For example, this message is the equivalent of Router Solicitation in the IP protocols.

ACQ_RSP: this message is used to deliver the new address for the mobile MN. This message is, for example, the equivalent of Router Advertisement in the IP protocols.

LOC_UPDATE: this message is used to update the location of the mobile MN with the entity AMA. For example, this message is the equivalent of Binding Update in the IP mobility protocols.

LOC_RSP: is used to confirm the update of the MN location. For example, this message is the equivalent of Binding Ack in the IP mobility protocols.

Figure 5:
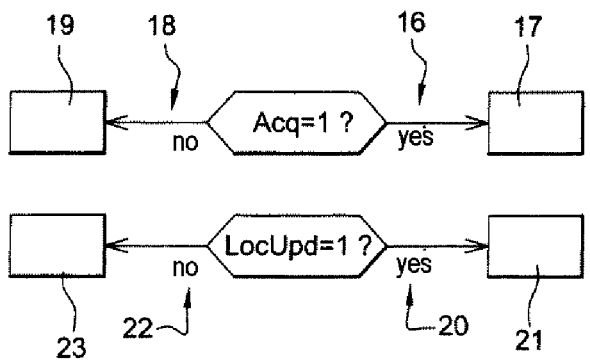
FIG. 5 illustrates the use of the two flags Acq and LocUpd of a handoff execution message in order to determine the handoff execution control.

FIG. 5 illustrates the use of the two flags Acq and LocUpd of a handoff execution message in order to determine the control of the handoff execution.

If the flag Acq is set to one 16 then the entity HOE must acquire 17 a new address to update the location of the mobile MN. Otherwise 18, the entity HOE finds 19 the new address of the mobile MN in the address field Acquired_Address.

If the flag LocUpd is at one 20, then the entity HOE must update 21 the location of the mobile with another entity HOE by means of a signaling message of the selected protocol, Mobility_Protocol. Otherwise 22, the entity HOE is informed 23 that it is not responsible for updating the location of the mobile MN.

There are various scenarios for implementing a method according to an embodiment of the invention illustrated by FIGS. 6 to 9. In the figures, the following notations have been used: the fields Mobility_Protocol, Acq, LocUpd, Acquired Address and Default Route are respectively abbreviated as P, A, L, ADDR and R. The handoff execution may be done with or without the involvement of the mobile terminal.

In the case where the terminal is involved in the execution of the handoff, three different scenarios can be distinguished.

Figure 6:
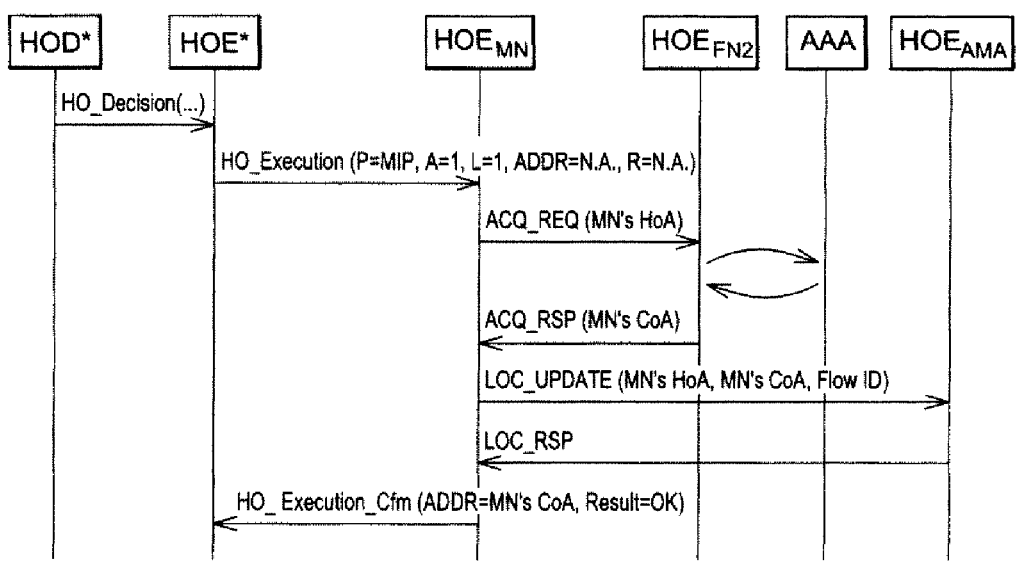
FIGS. 6 to 9 illustrate various scenarios for implementing a method according to an embodiment of the invention.
Figure 7:
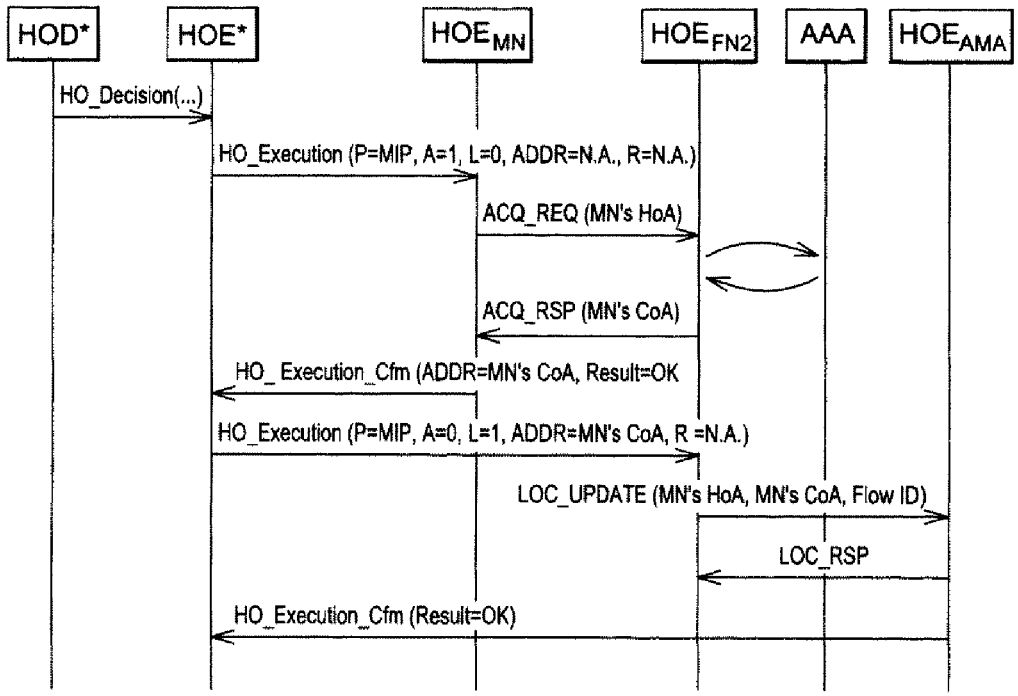
Figure 8:
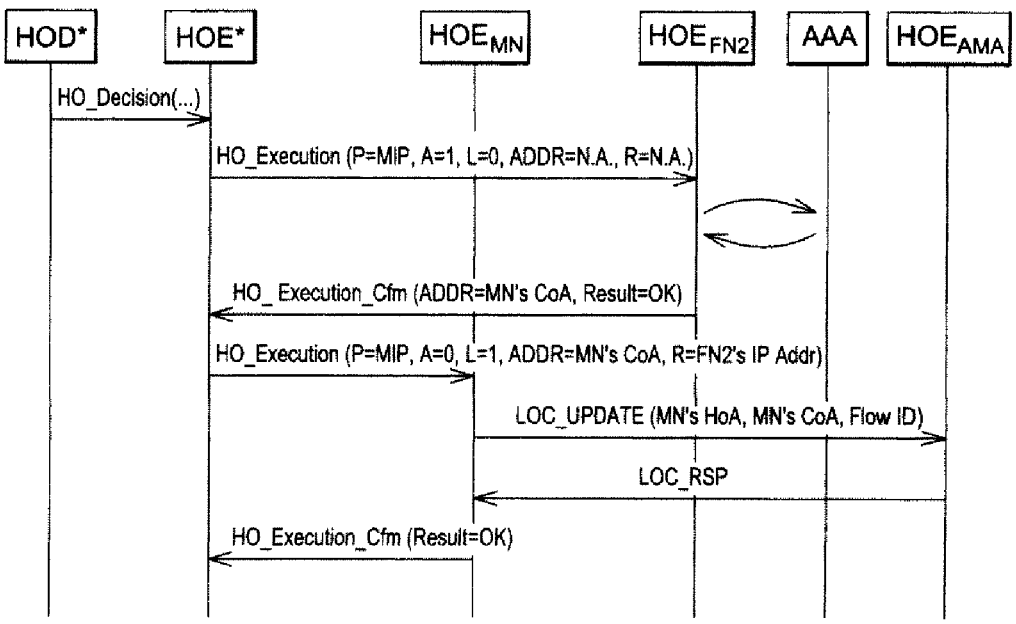

Scenario 1 illustrated by FIG. 6: the handoff execution protocol is all implemented by the mobile MN (i.e., acquisition of the address and location update). According to the illustration, the entities $HOE_{FN2}$ and AAA (authentication and authorization server, AAA standing for Authentication, Authorization, and Accounting) do not execute any function specific to the method according to an embodiment of the invention. Scenario 2 illustrated by FIG. 7: the address acquisition is performed by the mobile MN and the location update is executed by the network. The address MN's CoA recovered during address acquisition by the entity $HOE_{MN}$ is then used for the location update by the entity $HOE_{FN2}$. According to the illustration, the entity AAA does not execute any function specific to the method according to an embodiment of the invention. Scenario 3 illustrated by FIG. 8: the address acquisition is performed by the network and the location update is executed by the mobile MN. According to the illustration, the entity AAA does not execute any function specific to the method according to an embodiment of the invention.

Figure 9:
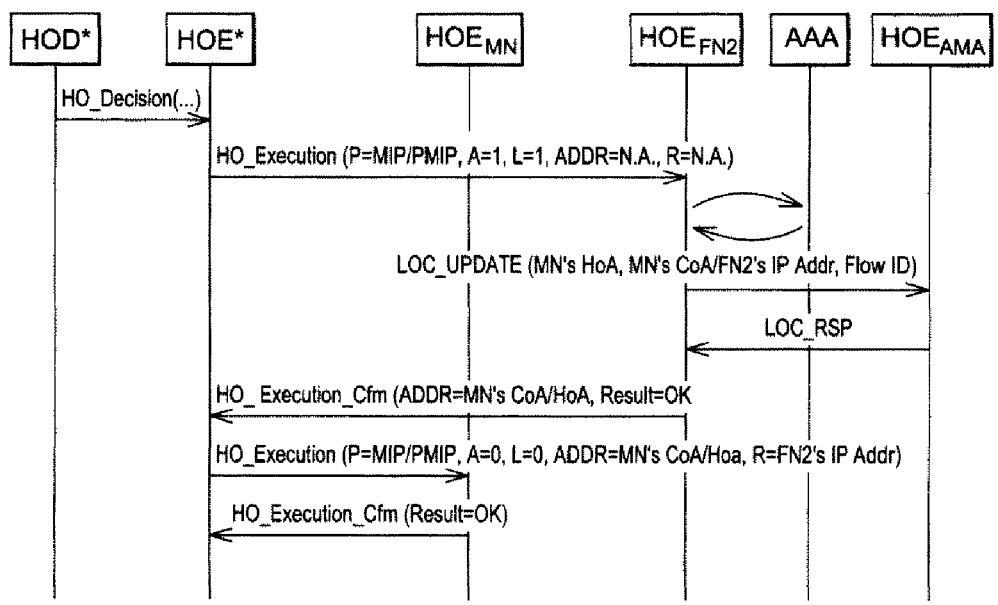

In the case where the terminal is not involved in the execution of the handoff, the following scenario illustrated by FIG. 9 shows that the execution of the handoff is controlled by the network. The address acquisition and the location update are performed by the network. The message HO_Execution sent to the mobile MN is used to inform it as to whether it is still in its subscription (home) network (PMIP case) or not (MIP case) and, if necessary, to announce to it its default gateway. The message HO_Execution sent to the mobile MN is the equivalent of a Router Advertisement message in the IP protocols. According to the illustration, the entity AAA does not execute any function specific to the method according to an embodiment of the invention.

Figure 10:
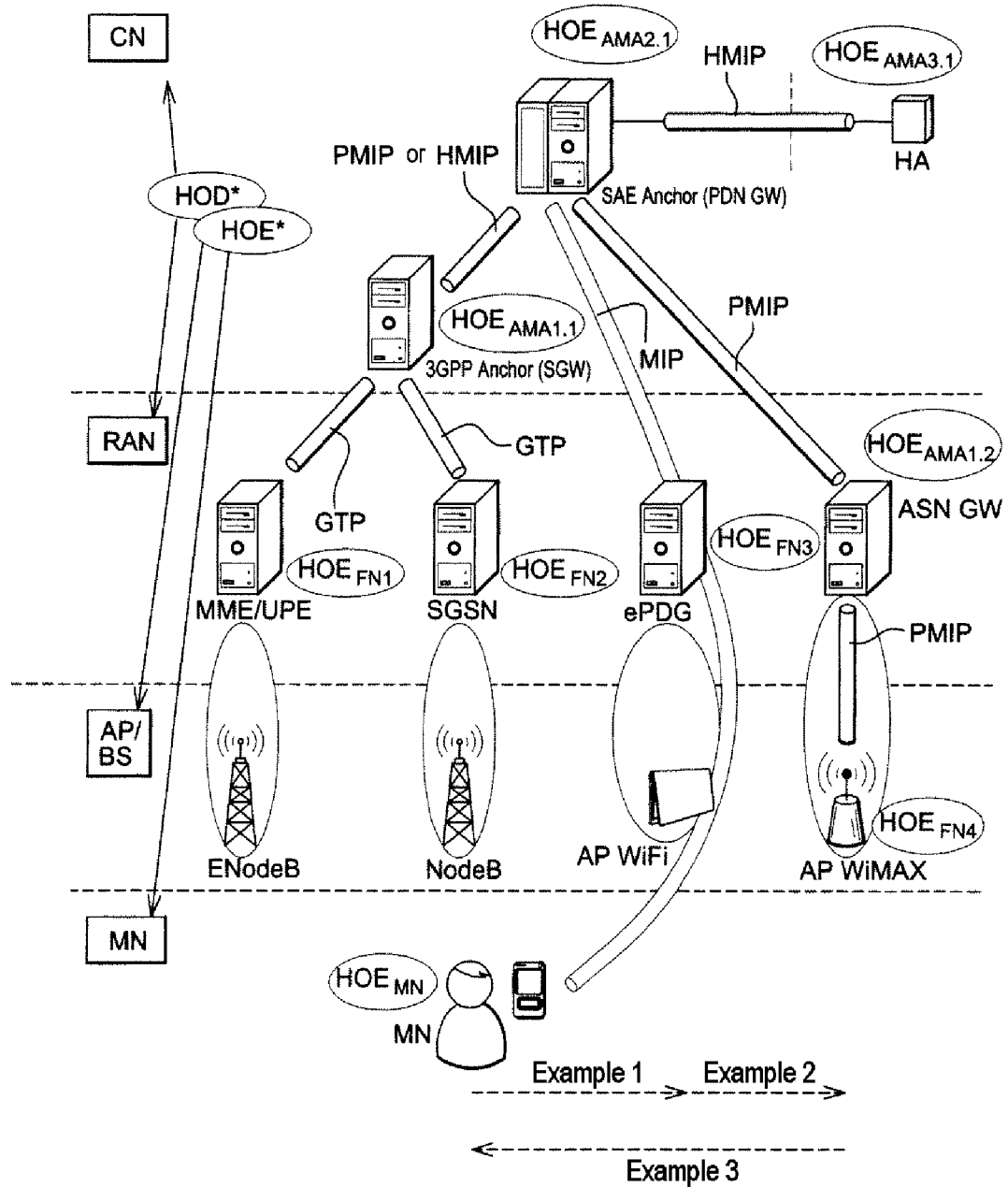
FIG. 10 is a diagram illustrating a multivendor architecture of a telecommunication system comprising a network consisting of a core network, several access networks, several access points implementing several mobility protocols, an architecture in which have been indicated the various decision and execution chain entities, according to a particular embodiment of a system according to an embodiment of the invention.

FIG. 10 is a diagram illustrating a multivendor architecture of a telecommunication system comprising a network consisting of a core network, several access networks and several access points implementing several mobility protocols, an architecture in which are indicated the various decision and execution chain entities, according to a particular embodiment of a system according to an embodiment of the invention. The architecture is distributed between four levels: a core network level CN (core network), an access network level RAN (radio access network), a radio access point level AP (access point), a mobile level MN (mobile node).

The mobility protocols that coexist within this illustrated architecture are MIP, PMIP, HMIP and GTP.

The various entities HOE* and HOE of the handoff execution chain may be distributed over several levels. According to the illustration, they are distributed over four levels: core network CN, access network RAN, access points AP/BS, mobile MN.

The entity HOE* may be located either in the network or in the terminal. An entity HOE in the network is capable of communicating with any other entity HOE of the same level or of a different level.

An embodiment of the invention is situated in a context in which the entity HOE* knows the hierarchy of the entities HOE distributed and located in the network and in which the execution chain comprises at least two entities: a first execution entity HOE* which receives the handoff order from the decision chain and an entity HOE which converts this order into messages of the selected execution protocol. This knowledge can be acquired by means of periodic announcements of the hierarchy of the entities HOE (AMA) in the network, or else the entities HOE are configured with the list of the entities HOE that are higher up in the hierarchy. Since the entity HOE* may be located in the mobile MN, the hierarchy of the HOEs must also be announced to the mobiles MNs. For this, each FN announces the hierarchy of the entities HOE (AMA, FN) to the mobiles MNs with the handoff order, or periodically in the network. These announcements are relayed by the access points.

The entity HOE* also knows the execution capabilities of the entities HOE and therefore knows which mobility protocols are implemented by the entities HOE. This knowledge can be acquired statically (once and for all for the system concerned) or dynamically (for example, each time a mobile has to be managed by an entity HOE). In the static case, there has to be a mechanism for updating and announcing execution capabilities in the network. In the dynamic case, the first entity HOE* may use a first request message to request the execution capabilities. The node HOE responds with a second message that contains the list of the mobility protocols that it supports.

In a multivendor network system, a mobile MN that has access to several networks of different technologies may have several identifiers, for example: MN's User ID, MN's NAI (Network Access Identifier), MN's HoA (Home Address). However, the mobile MN must be known with a single identifier by the network. Once the mobile presents itself in the network with this identifier, the network has to be capable of converting this identifier into another identifier necessary for the execution of a mobility protocol.

The learning of the mobile identifier may take place each time before the decision is taken: an entity HOD asks the mobile MN for its identifiers. Another mechanism may be to have the initial identifier of the mobile MN circulate with the decision messages and at the time of execution. There is then a search for the correct identifier of the mobile for the execution with a server of AAA type. For example, an MN is identified throughout the decision process by MN's User-ID. Before asking an entity HOE to execute the PMIP protocol, the MN's User-ID must be converted into MN's NAI (Network Access Identifier, an identifier used by the PMIP protocol) by querying a database in the network. In the case of cascaded execution of execution protocols, the identifier recovered at the time of the 1st execution is used at the time of the 2nd execution.

The following three examples illustrated by FIG. 10 illustrate the implementation of a method according to an embodiment of the invention in three particular cases of handoff between multivendor access networks. The first example relates to a switch from a UMTS network to a WiFi network. The second example relates to a switch from a WiFi network to a WiMAX network. The third example relates to a switch from a WiMAX network to a UMTS network.

Example 1

Switchover from a UMTS Network to a Wi-Fi Network

A handoff decision is taken by the entity HOD* to switch the traffic from the mobile MN from an access point NodeB of the UMTS network to an access point WiFi AP of the WiFi network. There are two possible scenarios: the execution is implemented by the mobile or by the network.

Scenario 1, Execution by the Mobile MN:
Implementation Context:
HOE* is collocated with HOD* (these two entities may be deployed either in the core network CN, the access network RAN, the access points AP/BS or the mobile MN).
HOE* knows that the NodeB is under the control of $HOE_{FN2}$, $HOE_{AMA1.1}$, $HOE_{AMA2.1}$.
HOE* knows that the WiFi AP is under the control of $HOE_{FN3}$, $HOE_{AMA2.1}$.
a) Discovery of execution capabilities of the node FN that will manage the mobile MN:
HOE*→$HOE_{FN3}$: HOE_CTX_REQ
$HOE_{FN3}$→HOE*: HOE_CTX_RSP (here, FN3 responds that it does not have the capability to execute any mobility protocol)
b) Selection of the execution protocol:
HOE* knows that, by default, the mobile MN implements the MIP protocol. Otherwise
HOE* must ask the mobile MN for its execution capabilities, as follows:
HOE*→$HOE_{MN}$: HOE_CTX_REQ
$HOE_{MN}$→HOE*: HOE_CTX_RSP (MIP)
c) Sending of the complete handoff execution message to the mobile MN:
A single node is designated to execute the MIP mobility, in this case the mobile MN:
HOE*→$HOE_{MN}$: HO_Execution (MN's User ID, Flow ID, Flow Direction, Interface ID, protocol=MIP, Acq=1, LocUpd=1, Acquired Address=N.A., Default Route=N.A.)
$HOE_{MN}$→HOE*: HO_Execution_Cfm (MN's CoA, Result=OK) sent after the handoff execution
d) Execution of the handoff by the mobile MN:
$HOE_{MN}$→$HOE_{FN3}$: ACQ_REQ (MN's HoA)
$HOE_{FN3}$→$HOE_{MN}$: ACQ_RSP (MN's CoA)
$HOE_{MN}$→$HOE_{AMA2.1}$: LOC_UPDATE (MN's HoA, MN's CoA, Flow ID)
$HOE_{AMA2.1}$→$HOE_{MN}$: LOC_RSP Scenario 2, Execution by the Network:
Implementation Context:
HOE* is collocated with HOD* (these two entities may be deployed either in the core network CN, the access network RAN, the access points AP/BS or the mobile MN).
HOE* knows that the NodeB is under the control of $HOE_{FN2}$, $HOE_{AMA1.1}$, $HOE_{AMA2.1}$.
HOE* knows that the WiFi AP is under the control of $HOE_{FN3}$, $HOE_{AMA2.1}$.
HOE* knows the identifier MN's HoA, otherwise it asks the mobile MN or a server AAA for the identifiers.
a) Discovery of the capabilities of the node FN that will manage the MN:
HOE*→$HOE_{FN3}$: HOE_CTX_REQ
$HOE_{FN3}$→HOE*: HOE_CTX_RSP (here, FN3 responds that it does not have the capability to execute any mobility protocol).
b) Selection of the execution protocol:
HOE* chooses to execute the MIP protocol for the mobile MN.
c) Address acquisition for the mobile MN:
HOE*→$HOE_{FN3}$: HO_Execution (MN's User ID, Flow ID, Flow Direction, Interface ID, Protocol=MIP, Acq=1, LocUpd=1, Acquired Address=N.A., Default Route=N.A.)
$HOE_{FN3}$ acquires an address CoA for the MN
$HOE_{FN3}$→HOE*: HO_Execution_Cfm (MN's CoA, Result=OK)
d) Location update by the network for the mobile MN:
$HOE_{FN3}$→$HOE_{AMA2.1}$: LOC_UPDATE (MN's HoA, MN's CoA, Flow ID)
$HOE_{AMA2.1}$→$HOE_{FN3}$: LOC_RSP
e) Address announcement to the mobile MN by a handoff execution message:
HOE* gives the mobile MN its new address CoA so that it can configure its interface with this address and discover its default gateway; this also enables the mobile MN to be prepared to decapsulate the IP packets for the incoming flows and direct the outgoing flows to the specified interface.
HOE*→$HOE_{MN}$: HO_Execution (MN's User ID, Flow ID, Flow Direction, Interface ID, Protocol=MIP_by_Net, Acq=0, LocUpd=0, Acquired Address=MN's CoA, Default Route=FN3's IP Addr)

Example 2

Switchover from a WiFi Network to a WiMAX Network

A handoff decision is taken by the entity HOD* to switch the traffic for the mobile MN from an access point WiFi AP to an access point WiMAX AP.
Implementation Context:
HOE* is collocated with HOD* (these two entities may be deployed either in the core network CN, the access network RAN, the access points AP/BS or the mobile MN).
HOE* knows that the WiFi AP is under the control of $HOE_{FN3}$, $HOE_{AMA2.1}$
HOE* knows that the WiMAX AP is under the control of $HOE_{FN4}$, $HOE_{AMA1.2}$, $HOE_{AMA2.1}$
$HOE_{FN4}$ knows that it is under the control of $HOE_{AMA1.2}$
$HOE_{AMA1.2}$ knows that it is under the control of $HOE_{AMA2.1}$
HOE* knows the identifier MN's NAI, otherwise it asks the mobile MN or a server AAA for the identifiers.
Execution Scenario:
a) Discovery of the capabilities of the nodes (FN, AMA):
HOE*→$HOE_{FN4}$: HOE_CTX_REQ
$HOE_{FN4}$→HOE*: HOE_CTX_RSP (here, FN4 responds that it can do PMIP)
Since $HOE_{FN4}$ and the old $HOE_{FN3}$ are not controlled by the same AMA, the HOE* asks $HOE_{FN4}$ for the capability of the hierarchically higher up AMA (i.e., $HOE_{AMA1.2}$)
HOE*→$HOE_{AMA1.2}$: HOE_CTX_REQ
$HOE_{AMA1.2}$→HOE*: HOE_CTX_RSP (here, $AMA_{1.2}$ responds that it can do PMIP)

Since $HOE_{AMA1.2}$ and $HOE_{FN3}$ are controlled by the same AMA (i.e., $HOE_{AMA2.1}$), the HOE* does not send any other capability request.
b) Selection of the execution protocol:
HOE* decides to delegate the execution of the two PMIP protocols respectively to $HOE_{AMA1.2}$ and $HOE_{FN4}$.
c) Sending of a complete handoff execution message to $HOE_{AMA1.2}$:
HOE*→$HOE_{AMA1.2}$: HO_Execution (MN's User ID, Flow ID, Flow Direction, Interface ID, Protocol=PMIP, Acq=1, LocUpd=1, Acquired Address=MN's NAI, Default Route=N.A.)
$HOE_{AMA1.2}$→HOE*: HO_Execution_Cfm (MN's HoA, Result=OK)
Since it is sent after the handoff execution order, the address for the location update, MN's HoA, is used later in the interchanges. HOE* also has the capability according to an embodiment of the invention to control the conversion of the identifiers of the mobile MN.
d) Execution of the handoff by $HOE_{AMA1.2}$:
$HOE_{AMA1.2}$→AAA Server: ACQ_REQ (MN's NAI)
AAA Server→$HOE_{AMA1.2}$: ACQ_RSP (MN's NAI, MN's HoA)
$HOE_{AMA1.2}$→$HOE_{AMA2.1}$: LOC_UPDATE (MN's HoA, $AMA_{1,2}$ IP Addr, Flow ID)
$HOE_{AMA2.1}$→$HOE_{AMA1.2}$: LOC_RSP
e) Sending of a handoff execution message to $HOE_{FN4}$:
HOE*→$HOE_{FN4}$: HO_Execution (MN's User ID, Flow ID, Flow Direction, Interface ID, Protocol=PMIP, Acq=0, LocUpd=1, Acquired Address=MN's HoA, Default Route=N.A.)
$HOE_{FN4}$→HOE*: Ho_Execution_Cfm (Result=OK)
f) Execution of the handoff by $HOE_{FN4}$:
$HOE_{FN4}$→$HOE_{AMA1.2}$: LOC_UPDATE (MN's HoA, Flow ID)
$HOE_{AMA1.2}$→$HOE_{FN4}$: LOC_RSP
g) Sending of a handoff execution message to the MN:
This announces to the mobile its address HoA and enables it to discover its default gateway; this also enables the mobile MN to switch the outgoing flows to the specified interface.
HOE*→$HOE_{MN}$: HO_Execution (MN's User ID, Flow ID, Flow Direction, Interface ID, Protocol=PMIP, Acq=0, LocUpd=0, Acquired Address=MN's HoA, Default Route=FN4's IP Addr)
$HOE_{MN}$→HOE*: Ho_Execution_Cfm (Result=OK)

Example 3

Switchover from a WiMAX Network to a UMTS Network

A handoff decision is taken by HOD* to switch the traffic for the mobile MN from an access point WiMAX AP to an access point NodeB.
Implementation Context:
HOE* is collocated with HOD* (these two entities may be deployed either in the core network CN, the access network RAN, the access points AP/BS or the mobile MN)
HOE* knows that the WiMAX AP is under the control of $HOE_{FN4}$, $HOE_{AMA1.2}$, $HOE_{AMA2.1}$
HOE* knows that the NodeB is under the control of $HOE_{FN2}$, $HOE_{AMA1.1}$, $HOE_{AMA2.1}$
HOE* knows the identifiers of the MN, otherwise it asks the MN or a server AAA for them.
Execution Scenarios:
a) Discovery of the capability of the nodes (FN, AMA):
HOE*→$HOE_{FN2}$: HOE_CTX_REQ
$HOE_{FN2}$→HOE*: HOE_CTX_RSP (here, FN2 responds that it can implement a GTP protocol)

Since $HOE_{FN2}$ and the old $HOE_{FN4}$ are not controlled by the same AMA, the HOE* enquires about the capability of AMA hierarchically above $HOE_{FN2}$ (i.e., $HOE_{AMA1.1}$)
HOE*→$HOE_{AMA1.1}$: HOE_CTX_REQ
$HOE_{FN2}$→HOE*: HOE_CTX_RSP (PMIP or HMIP)
Since $HOE_{AMA1.1}$ and $HOE_{AMA1.2}$ are controlled by the same AMA (i.e., $HOE_{AMA2.1}$), the HOE* does not send any other capability request.
b) Address acquisition for the mobile MN:
This address acquisition is normally performed during UMTS attachment (more specifically, upon the request to activate the PDP context).
c) Location update and setting up of the GTP Tunnel:
This step is normally performed during UMTS attachment.
d) Selection of the execution protocol:
In the exemplary architecture of FIG. 10, the HOE* can choose one of the following three sub-scenarios: PMIP, HMIP executed by the network or HMIP executed by the terminal.
Sub-Scenario 1: PMIP (Delegation of the Execution to HOE AMA1.1)
i) Sending of a handoff execution message to the $HOE_{AMA1.1}$:
HOE*→$HOE_{AMA1.1}$: HO_Execution (MN's User ID, Flow ID, Flow Direction, Interface ID, Protocol=PMIP, Acq=0, LocUpd=1, Acquired Address=MN's HoA, Default Route=N.A.)
The address MN's HoA is recovered during attachment to the UMTS network.
ii) Execution of the handoff by $HOE_{AMA1.1}$:
$HOE_{AMA1.1}$→$HOE_{AMA2.1}$: LOC_UPDATE (MN's HoA, $AMA_{1.1}$ IP Addr, Flow ID)
$HOE_{AMA2.1}$→$HOE_{AMA1.1}$: LOC_RSP
iii) Sending of a handoff execution message to the mobile MN:
This enables the mobile MN to direct the outgoing flows to the specified interface. The mobile should already know its address HoA and its default router from its attachment to the UMTS network.
HOE*→$HOE_{MN}$: HO_Execution (MN's User ID, Flow ID, Flow Direction, Interface ID, Protocol=PMIP, Acq=0, LocUpd=0, Acquired Address=N.A., Default Route=N.A.)
Sub-Scenario 2: HMIP Executed by the Network (Delegation of the Execution to HOE AMA1.1)
i) Sending of a handoff execution message to the $HOE_{AMA1.1}$:
HOE*→$HOE_{AMA1.1}$: HO_Execution (MN's User ID, Flow ID, Flow Direction, Interface ID, Protocol=HMIP_by_Net, Acq=0, LocUpd=1, Acquired Address=$HOE_{AMA2.1}$ IP Addr, Default Route=N.A.)
MN's HoA is recovered during attachment to the UMTS network.
ii) Location update by $HOE_{AMA1.1}$:
$HOE_{AMA1.1}$→$HOE_{AMA2.1}$: LOC_UPDATE (MN's HoA, $AMA_{1.1}$ IP Addr, Flow ID)
$HOE_{AMA2.1}$→$HOE_{AMA1.1}$: LOC_RSP
iii) Sending of a handoff execution message to the MN:
This enables the mobile MN to direct the outgoing flows to the specified interface. The mobile should already know its address HoA and its default router from its attachment to the UMTS network.
HOE*→$HOE_{MN}$: HO_Execution (MN's User ID, Flow ID, Flow Direction, Interface ID, Protocol=HMIP_by_Net, Acq=0, LocUpd=0, Acquired Address=N.A., Default Route=N.A.)

Sub-Scenario 3: HMIP Executed by the MN
i) Sending of a handoff execution message to the MN:
This also enables the mobile MN to direct the outgoing flows to the specified interface. The mobile should already know its address HoA and its default router from its attachment to the UMTS network.
HOE*→HOE$_{MN}$: HO_Execution (MN's User ID, Flow ID, Flow Direction, Interface ID, Protocol=HMIP, Acq=0, LocUpd=1, Acquired Address=N.A., Default Route=N.A.)
HOE$_{MN}$→HOE*: Ho_Execution_Cfm (Result=OK)
ii) Execution of the handoff by the mobile MN:
The mobile should know that AMA$_{1.1}$ is under the control of AMA$_{2.1}$.
HOE$_{MN}$→HOE$_{AMA2.1}$: LOC_UPDATE (MN's HoA, AMA$_{1.1}$ IP Addr, Flow ID)
HOE$_{AMA2.1}$→HOE$_{MN}$: LOC_RSP Although the present disclosure has been described with reference to one or more examples, workers skilled in the art will recognize that changes may be made in form and detail without departing from the scope of the disclosure and/or the appended claims.

The invention claimed is:

1. A method for handing off flows between a first access point to a first access network to an IP-type core network to which a terminal is attached, called current network, and a second access point to a second access network to the core network, called visited network, the network being made up of the various preceding networks and access points, wherein the flow has a flow identifier and is established between the terminal and a correspondent, and wherein the terminal has as many terminal identifiers as access interfaces to access networks of mutually different data technologies, the method comprising, after a handoff decision has been taken for a given pair of flow and terminal identifiers:
   a step of reception of a handoff execution order emanating from a handoff decision entity, by a first execution entity, which converts the handoff execution order into execution messages taking into account a hierarchy of execution entities of the network, the execution order containing at least fields comprising the flow identifier, the terminal identifier, an identifier of the current access point, an identifier of the visited access point and a flow direction identifier at the terminal level,
   a step of selection, by the first execution entity, of a mobility protocol from the mobility protocols supported by the execution entities of the hierarchy associated with the network, wherein the first execution entity learns the mobility protocols supported by the execution entities of the hierarchy associated with the network dynamically by message interchange with these execution entities,
   a step of selection, by the first execution entity, in the hierarchy of at least one second execution entity responsible for executing the mobility protocol,
   a step of sending, by the first execution entity, to the selected second execution entity of respective execution messages containing at least the fields comprising the flow identifier, the terminal identifier, a flow direction indicator, an identifier of a network interface to which the mobility protocol must be applied, an indicator of the selected protocol, an address of the terminal, a default router address and two flags to indicate to the second execution entity if the second execution entity is responsible for acquisition of an update address for the terminal and for updating of a location of the terminal.

2. The handoff method as claimed in claim 1, wherein, if the flow direction indicator is set to incoming and if a Proxy Mobile Internet Protocol (PMIP) is selected, then the first execution entity sends a handoff execution message to an execution entity of the network, and wherein, if the flow direction indicator is set to outgoing and if the PMIP protocol is selected, then the first execution entity sends a handoff execution message to an execution entity of the network and a handoff execution message to an execution entity of the terminal to reorient packets of the flow.

3. The handoff method as claimed in claim 1, wherein the first execution entity learns the mobility protocols following a handoff decision.

4. The handoff method as claimed in claim 1, wherein the execution entity responsible for the acquisition of an update address of the terminal and for the updating of the location of the terminal is located in the network and wherein the first execution entity sends an execution message, after a return of an execution acknowledgement by the execution entity responsible for the acquisition of an update address of the terminal and for the updating of the location of the terminal, to an execution entity of the terminal with the terminal address and default router address fields completed.

5. The handoff method as claimed in claim 1, wherein the first execution entity is located in the terminal and knows the hierarchy of the execution entities through information supplied, following a handoff decision, by an entity of the access network that has connectivity below IP-User, and transmitted to the terminal by the access point to which the terminal is attached.

6. A device adapted to implement a method for handing off flows between a first access point to a first access network to an IP-type core network to which a terminal is attached, called current network, and a second access point to a second access network to the core network, called visited network, the network being made up of the various preceding networks and access points, wherein the flow has a flow identifier and is established between the terminal and a correspondent, and wherein the terminal has as many terminal identifiers as access interfaces to access networks of mutually different data technologies, the device comprising:
   handoff decision means for generating a handoff execution order following a handoff decision for a given pair of flow and terminal identifiers, the handoff execution order containing at least fields comprising the flow identifier, the terminal identifier, an identifier of the current access point, an identifier of the visited access point and a flow direction indicator at a level of the terminal; and
   first execution means for receiving the handoff execution order emanating from the handoff decision means and for converting the handoff execution order into execution messages by taking into account a hierarchy of execution entities of the network comprising at least one other execution entity, wherein the first execution means is further configured for:
   a. selecting a mobility protocol from mobility protocols supported by the execution entities of the hierarchy associated with the network, wherein the first execution means learns the mobility protocols supported by the execution entities of the hierarchy associated with the network dynamically by message interchange with these execution entities,
   b. selecting from the hierarchy at least one execution entity responsible for executing the mobility protocol, and
   c. sending to the selected execution entity respective execution messages containing at least the fields comprising the flow identifier, the terminal identifier, the flow direction indicator, an identifier of a network interface to which the mobility protocol must be applied, an indicator of the selected protocol, an address of the terminal, a default router address and two flags to indicate to the selected execution entity if the selected execution entity is responsible for acquisition of an update address for the terminal and for updating of a location of the terminal.

7. A telecommunication system comprising a network, wherein the network comprises:
at least one IP-type core network,
first and a second access networks to the core network,
a first access point to the first access network to which a terminal is attached, called current network, and
a second access point to the second access network, called visited network, configured to handoff a flow between the first access point and the second access point, wherein the flow has a flow identifier and is established between the terminal and a correspondent, and wherein the terminal has as many terminal identifiers as access interfaces to access networks of mutually different data technologies,
handoff decision means for generating and sending a handoff execution order following a handoff decision for a given pair of flow and terminal identifiers, the handoff execution order containing at least fields comprising the flow identifier, the terminal identifier, an identifier of the current access point, an identifier of the visited access point and a flow direction indicator at a level of the terminal; and
first execution means for receiving the handoff execution order sent from the handoff decision means and for converting the handoff execution order into execution messages by taking into account a hierarchy of execution entities of the network comprising at least one other execution entity, wherein the first execution means is further configured for:
selecting a mobility protocol from mobility protocols supported by the execution entities of the hierarchy associated with the network, wherein the first execution means learns the mobility protocols supported by the execution entities of the hierarchy associated with the network dynamically by message interchange with these execution entities,
selecting from the hierarchy at least one execution entity responsible for executing the mobility protocol, and
sending to the selected execution entity respective execution messages containing at least the fields comprising the flow identifier, the terminal identifier, the flow direction indicator, an identifier of a network interface to which the mobility protocol must be applied, an indicator of the selected protocol, an address of the terminal, a default router address and two flags to indicate to the selected execution entity if the selected execution entity is responsible for acquisition of an update address for the terminal and for updating a location of the terminal.

8. An execution device, for use in a telecommunication system comprising a network comprising at least one IP-type core network, a first and a second access networks to the core network, a first access point to the first access network to which a terminal is attached, called current network, and a second access point to the second access network, called visited network, the system being able to handoff a flow between the first access point and the second access point, wherein the flow has a flow identifier and is established between the terminal and a correspondent, and wherein the terminal has as many terminal identifiers as access interfaces to access networks of mutually different data technologies, the network also comprising a handoff decision entity configured to generate and send a handoff execution order following a handoff decision for a given pair of flow and terminal identifiers, the handoff execution order containing at least fields comprising the flow identifier, the terminal identifier, an identifier of the current access point, an identifier of the visited access point and a flow direction indicator at a level of the terminal, wherein the execution device comprises:
means for receiving the handoff execution order sent from the decision means and for converting the handoff decision order into execution messages by taking into account a hierarchy of execution entities of the current network comprising at least one other execution entity,
means for selecting a mobility protocol from mobility protocols supported by the execution entities of the hierarchy associated with the network, wherein the execution device learns the mobility protocols supported by the execution entities of the hierarchy associated with the network dynamically by message interchange with these execution entities,
means for selecting from the hierarchy at least one execution entity responsible for executing the mobility protocol, and
means for sending to the selected execution entity respective execution messages containing at least the fields comprising the flow identifier, the terminal identifier, the flow direction indicator, an identifier of a network interface to which the mobility protocol must be applied, an indicator of the selected protocol, an address of the terminal, a default router address and two flags to indicate to the selected execution if the selected execution entity is responsible for acquisition of an update address for the terminal and for updating a location of the terminal.

9. A non-transient computer-readable information medium comprising a computer program stored thereon, said program comprising program instructions suitable for implementing, when said program is loaded and run in a device, a method for handing off flows between a first access point to a first access network to an IP-type core network to which a terminal is attached, called current network, and a second access point to a second access network to the core network, called visited network, the network being made up of the various preceding networks and access points, wherein the flow has a flow identifier and is established between the terminal and a correspondent, and wherein the terminal has as many terminal identifiers as access interfaces to access networks of mutually different data technologies, the method comprising, after a handoff decision has been taken for a given pair of flow and terminal identifiers:
a step of reception of an execution order emanating from a handoff decision entity, by a first execution entity, which converts the handoff execution order into execution messages taking into account a hierarchy of execution entities of the network, the execution order containing at least fields comprising the flow identifier, the terminal identifier, an identifier of the current access point, an identifier of the visited access point and a flow direction identifier at the terminal level,
a step of selection, by the first execution entity, of a mobility protocol from the mobility protocols supported by the execution entities of the hierarchy associated with the network, wherein the first execution entity learns the mobility protocols supported by the execution entities of the hierarchy associated with the network dynamically by message interchange with these execution entities,
a step of selection, by the first execution entity, in the hierarchy of at least one second execution entity responsible for executing the mobility protocol, a step of sending, by the first execution entity, to the selected second execution entity of respective execution messages containing at least the fields comprising the flow identifier, the terminal identifier, the flow direction indicator, an identifier of a network interface to which the mobility protocol must be applied, an indicator of the selected protocol, an address of the terminal, a default router address and two flags to indicate to the second execution entity if the second execution entity is responsible for acquisition of an update address for the terminal and for updating of a location of the terminal.

* * * * *